United States Patent
Mori et al.

(10) Patent No.: US 7,529,600 B2
(45) Date of Patent: May 5, 2009

(54) TURNING CONTROL DEVICE AND METHOD

(75) Inventors: Yukio Mori, Kariya (JP); Kazutaka Kato, Kariya (JP); Kazuhiro Kamiya, Kariya (JP); Masahiro Matsuura, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 526 days.

(21) Appl. No.: 11/110,821

(22) Filed: Apr. 21, 2005

(65) Prior Publication Data

US 2005/0240332 A1   Oct. 27, 2005

(30) Foreign Application Priority Data

Apr. 27, 2004   (JP)   ............................ 2004-131370

(51) Int. Cl.
  G05D 1/00   (2006.01)
  G01C 22/00  (2006.01)
  G06F 7/00   (2006.01)

(52) U.S. Cl. .............................. 701/1; 701/23; 701/25; 701/26; 701/27; 701/41; 701/48; 701/52; 701/53; 701/54; 701/70; 701/78; 701/83

(58) Field of Classification Search .................. 701/41, 701/42, 43, 48, 88, 36, 23, 26, 70, 72, 75, 701/79, 91, 67, 69; 116/31; 180/6.2, 410, 180/443, 244, 271, 199; 280/1, 761, 124, 280/126; 340/932.2; 477/174, 175, 182, 477/903; 33/203.18, 203
See application file for complete search history.

(56) References Cited

U.S. PATENT DOCUMENTS

| 4,848,851 | A | * | 7/1989 | Kuraoka et al. ............. 303/124 |
| 5,159,991 | A | * | 11/1992 | Tsuyama et al. ............ 180/197 |
| 5,320,422 | A | * | 6/1994 | Tsuyama et al. ............ 303/141 |
| 5,645,326 | A | * | 7/1997 | Sano .......................... 303/146 |
| 5,710,704 | A | * | 1/1998 | Graber ........................ 701/82 |
| 5,782,543 | A | * | 7/1998 | Monzaki et al. ............. 303/146 |
| 6,259,980 | B1 | * | 7/2001 | Peck et al. .................... 701/24 |
| 6,438,474 | B1 | * | 8/2002 | Tanaka et al. ................. 701/41 |
| 6,970,787 | B2 | * | 11/2005 | Matsumoto et al. ......... 701/301 |

FOREIGN PATENT DOCUMENTS

JP   A-10-100740   4/1998

* cited by examiner

*Primary Examiner*—Khoi Tran
*Assistant Examiner*—Bhavesh Amin
(74) *Attorney, Agent, or Firm*—Posz Law Group, PLC

(57) ABSTRACT

A target vehicle path is corrected in accordance with the environment surrounding a vehicle during parking assist or U-turn assist. To achieve the target vehicle path, target wheel speeds are set for respective wheels so as to generate a speed difference an inside wheel and an outside wheel of a turn. The target wheel speed is achieved by controlling braking force and driving force of each wheel. Thus, it is possible for the vehicle to turn with a smaller turning radius than that generated by a normal steering angle, and to cause the vehicle to move accurately along the target vehicle path that avoids any obstacles that are present.

11 Claims, 8 Drawing Sheets

| RELATIONSHIPS BETWEEN TARGET WHEEL SPEED OF REFERENCE WHEEL AND ACTUAL WHEEL SPEED | ACTUAL ACCELERATION OF REFERENCE WHEEL | | |
|---|---|---|---|
| | ACTUAL ACCELERATION≦G1 | G1< ACTUAL ACCELERATION≦G2 | G2< ACTUAL ACCELERATION |
| 1. TARGET WHEEL SPEED + VA < ACTUAL WHEEL SPEED | APERTURE MAINTAINED | APERTURE MAINTAINED | RAPID CLOSING |
| 2. TARGET WHEEL SPEED + VB < ACTUAL WHEEL SPEED ≦ TARGET WHEEL SPEED + VA | APERTURE MAINTAINED | APERTURE MAINTAINED | SLOW CLOSING |
| 3. TARGET WHEEL SPEED − VC < ACTUAL WHEEL SPEED ≦ TARGET WHEEL SPEED + VB | SLOW OPENING | APERTURE MAINTAINED | APERTURE MAINTAINED |
| 4. ACTUAL WHEEL SPEED ≦ TARGET WHEEL SPEED − VC | RAPID OPENING | SLOW OPENING | SLOW OPENING |

FIG. 7

| RELATIONSHIPS BETWEEN TARGET WHEEL SPEED OF EACH WHEEL AND ACTUAL WHEEL SPEED | ACTUAL ACCELERATION OF EACH WHEEL | | |
|---|---|---|---|
| | ACTUAL ACCELERATION $\leq$ G1 | G1 < ACTUAL ACCELERATION $\leq$ G2 | G2 < ACTUAL ACCELERATION |
| 1. TARGET WHEEL SPEED + VA < ACTUAL WHEEL SPEED | HYDRAULIC PRESSURE MAINTAINED | HYDRAULIC PRESSURE MAINTAINED | RAPID PRESSURE INCREASE |
| 2. TARGET WHEEL SPEED + VB < ACTUAL WHEEL SPEED $\leq$ TARGET WHEEL SPEED + VA | HYDRAULIC PRESSURE MAINTAINED | HYDRAULIC PRESSURE MAINTAINED | SLOW PRESSURE INCREASE |
| 3. TARGET WHEEL SPEED − VC < ACTUAL WHEEL SPEED $\leq$ TARGET HEEL SPEED + VB | SLOW PRESSURE DECREASE | HYDRAULIC PRESSURE MAINTAINED | HYDRAULIC PRESSURE MAINTAINED |
| 4. ACTUAL WHEEL SPEED $\leq$ TARGET WHEEL SPEED − VC | RAPID PRESSURE DECREASE | SLOW PRESSURE DECREASE | SLOW PRESSURE DECREASE |

FIG. 8

TURNING CONTROL DEVICE AND METHOD

CROSS REFERENCE TO RELATED APPLICATION

This application is based upon and claims the benefit of Japanese Patent Application No. 2004-131370 filed on Apr. 27, 2004, the content of which are incorporated herein by reference.

FIELD OF THE INVENTION

The present invention relates to a vehicle turning control device and a method and program for the same.

BACKGROUND OF THE INVENTION

Related art is known that reduces a turning radius by braking a rear wheel on the inside of a turn in accordance with a steering operation when a vehicle is turning (for an example, refer to Japanese Patent Laid-Open Publication No. 10-100740).

However, in the related art, after drive of front wheels of the vehicle has been switched to a high-speed side, braking force is only applied to the rear wheel on the inside of the turn in accordance with a steering angle of the front wheels. Accordingly, it is not considered for performing control to assist the vehicle in following an accurate path, or preventing significant changes in vehicle behavior.

SUMMARY OF THE INVENTION

It is an object of the present invention to assist a vehicle in following an accurate path in accordance with a running state thereof.

According to a first aspect of the invention, when a low speed turn determination portion determines that a vehicle is in a turning operation state and running at a low speed, a braking force control portion controls braking force applied to a wheel based on a target wheel speed such that an actual wheel speed converges on the target wheel speed. The target wheel speed is set by a target wheel speed setting portion and corresponds to a vehicle path that it is desirable for the vehicle to move along. Accordingly, during low speed turning, it is possible to cause the vehicle to move along a turning path that accurately corresponds to the desired vehicle path.

Further, the first aspect may include a driving force control portion for controlling driving force of the vehicle such that the wheel speed converges on the set target wheel speed. Accordingly, even if braking force is generated by the braking force control portion for turning control, the driving force of the vehicle is controlled simultaneously and thus it is possible to compensate for any torque insufficiency and inhibit the vehicle from stopping.

The driving force control portion may control the driving force of the vehicle in accordance with a wheel speed of a reference wheel and a target wheel speed of the reference wheel. This reference wheel is, for example, taken to be a wheel at the outside of a turn of the vehicle.

Further, the target wheel speed setting portion may cause there to be a speed difference between respective left and right target wheel speeds of, at least one of, a left and right pair of front wheels, and a left and right pair of rear wheels.

With this configuration, it is possible to generate a speed difference between the respective left and right wheels of at least one of the pair of front wheels and the pair of rear wheels. Accordingly, it is possible for the vehicle to move along a turning path with a smaller turning radius than that of the turning path generated by the steering angle of the steered wheels.

In addition, the first aspect may include a target path setting portion for setting a target vehicle path of the vehicle. The target wheel speed setting portion may then set the target wheel speed in accordance with the set target vehicle path.

Further, the first aspect may include a surrounding environment detection portion for detecting a surrounding environment of the vehicle. The target path setting portion may then set the target vehicle path in accordance with the detected surrounding environment, for example, in accordance with the position of obstacles or the like.

The first aspect may also include a path deviation calculation portion that calculates a deviation between a projected actual path of the vehicle and the target vehicle path. In this case, if the deviation exceeds a pre-set determined value, the path deviation calculation portion terminates operation of the braking force control portion. Thus, it is possible to ensure that the turning control is performed safely.

Note that, the invention is not limited to being embodied in the above described form of a turning control device, but may also be realized as a method, or as a program that causes a computer to function in various ways.

BRIEF DESCRIPTION OF THE DRAWINGS

Other objects, features and advantages of the present invention will be understood more fully from the following detailed description made with reference to the accompanying drawings. In the drawings:

FIG. 7 is a map showing a control characteristic of the accelerator aperture; and FIG. 8 is a map showing a control characteristic of the brake pressure.

DETAILED DESCRIPTION OF THE PREFERRED EMBODIMENTS

Figure 1:
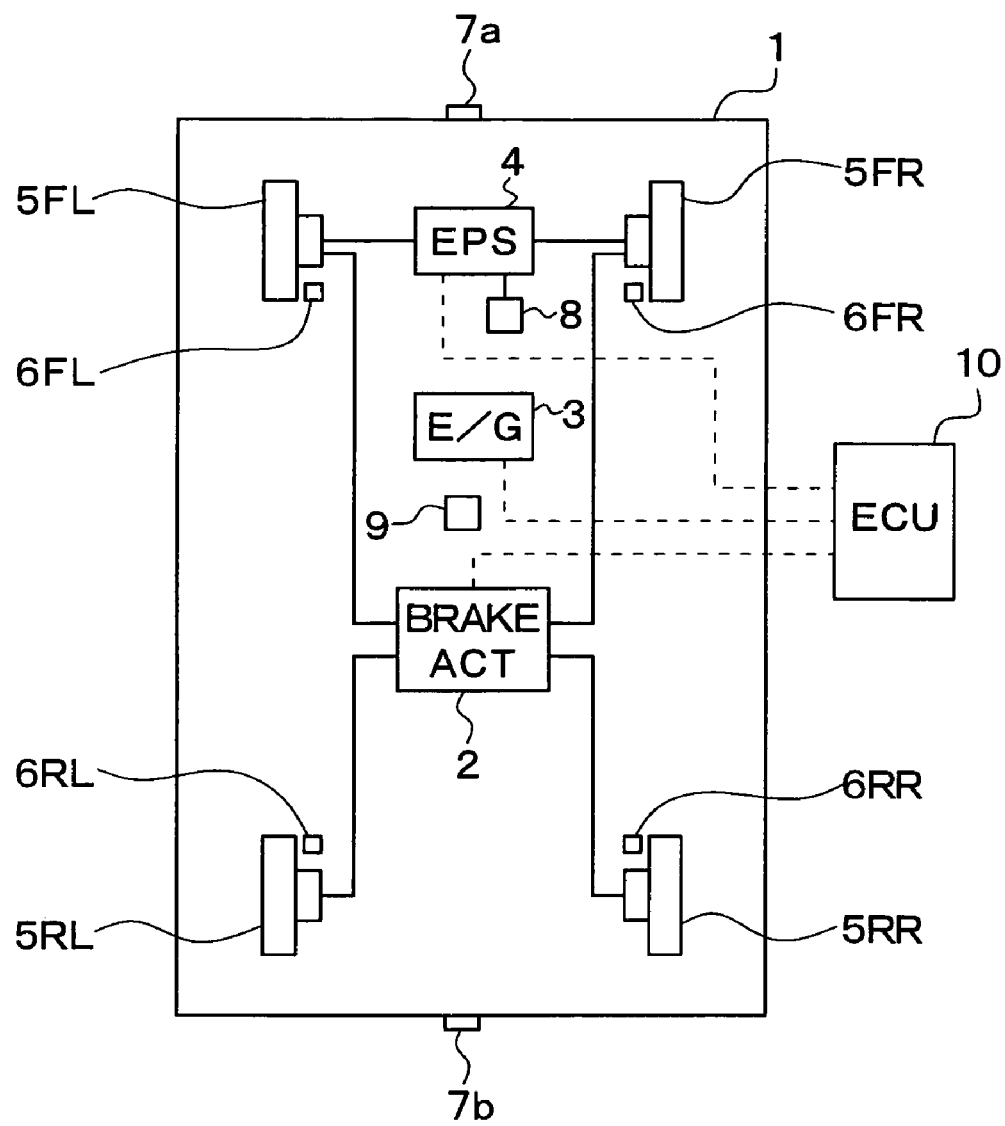
FIG. 1 shows the overall configuration of a turning control device of an embodiment.

The present invention will be described further with reference to various embodiments in the drawings.

FIG. 1 shows the overall configuration of a turning control device of the embodiment. Note that, a vehicle 1 that is described in this embodiment is a front wheel drive vehicle. However, the present invention is not limited to this type of vehicle and may be applied to a rear wheel drive vehicle, a four wheel drive vehicle, or a vehicle capable of independently controlling a driving force of each wheel. The front right, front left, rear right and rear left wheels of the vehicle 1 are indicated by the reference characters 5FR, 5FL, 5RR and 5RL, respectively.

The embodiment is provided with a brake actuator 2; an engine (E/G) 3; an Electric Power Steering (EPS) unit 4; vehicle wheel speed sensors 6FR, 6FL, 6RR and 6RL; surroundings monitoring sensors 7a and 7b; steering sensor 8; yaw rate sensor 9; and a turning control ECU 10. The brake actuator 2 is capable of independently generating braking force for each wheel 5FR, 5FL, 5RL and 5RR, and the vehicle wheel speed sensors 6FR, 6FL, 6RR and 6RL detect a rotation speed of each wheel 5FR to 5RL. The surroundings monitoring sensors 7a and 7b act as a surrounding environment detection device and monitor the environment around the vehicle 1 using CCD cameras provided at front and rear areas of the vehicle 1. The steering sensor 8 detects a steering angle (a steering angle of a steering wheel, not shown), and the yaw rate sensor 9 detects a yaw rate of the vehicle 1.

The brake actuator 2 functions as an automatic brake device for generating braking force, namely, a wheel cylinder (WC) pressure, of each wheel 5FR to 5RL. The braking force is generated either in accordance with a depression value of a brake pedal (not shown) caused by a driver, or in accordance with a control signal calculated by the turning control ECU 10, irrespective of the presence of a brake pedal depression value. Note that, when automatic brake control is being performed, when the driver operates the brake pedal, the brake actuator 2 releases automatic brake control and normal braking force is applied to each wheel 5FR to 5RL in accordance with the brake pedal depression value.

The EPS unit 4 generates a steering angle of the front wheels 5FR and 5FL using an electric actuator (not shown) in accordance with the steering angle detected by the steering sensor 8.

It should be noted that, during execution of parking assist control in which the vehicle 1 performs the steering operation itself in place of the driver to assist with parking, the EPS unit 4 activates the electric actuator to rotate the steering wheel and applies a steering angle to the right and left rear wheels 5FR and 5FL. The electric actuator is activated in accordance with a steering angle command value from a steering control portion 14 of the turning control ECU 10.

Figure 2:
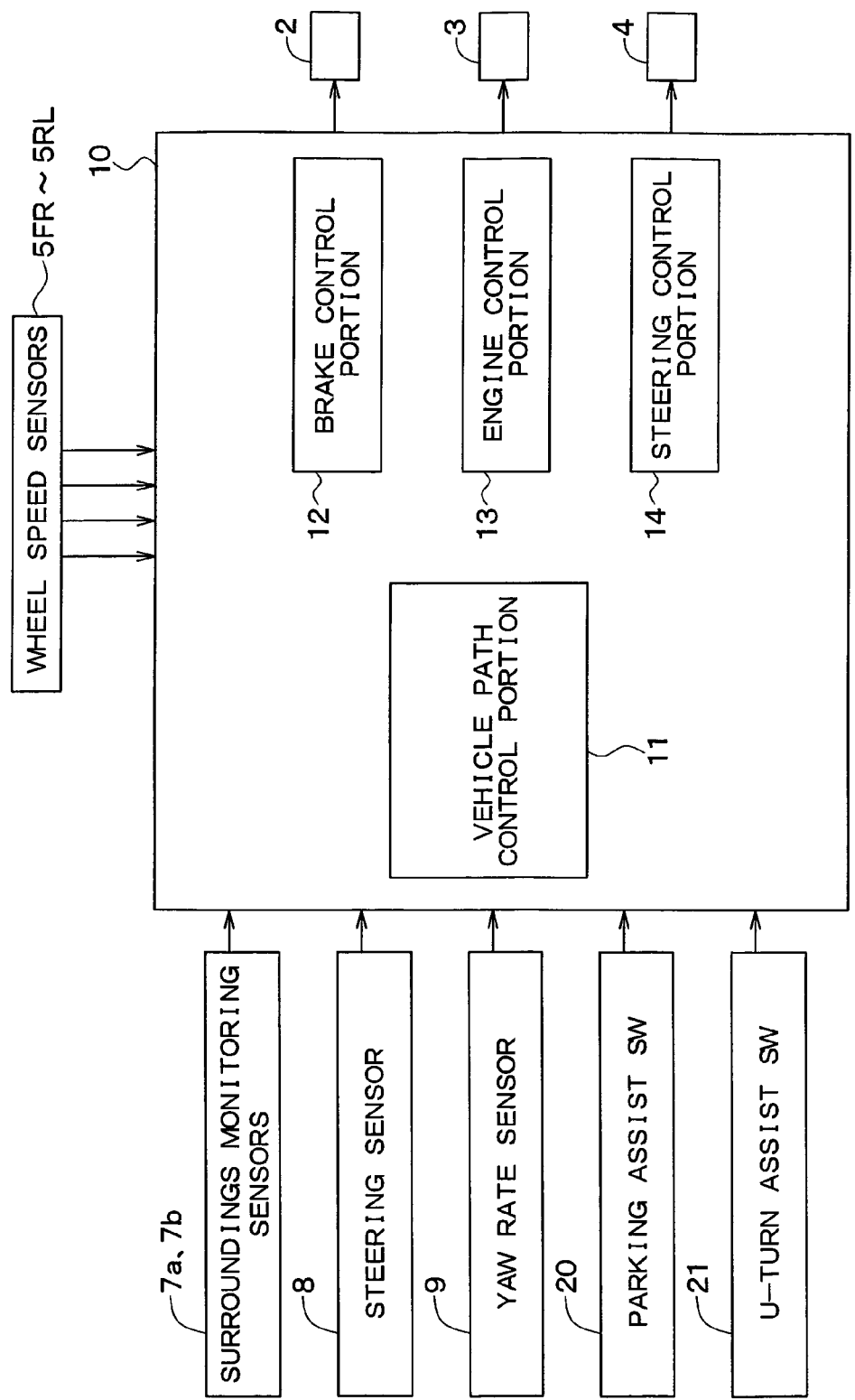
FIG. 2 is a function block diagram of a turning control ECU.

The turning control ECU 10 is configured by a computer. FIG. 2 shows a function block diagram of the turning control ECU 10. In FIG. 2, the different control functions of the turning control ECU 10 are shown as respective blocks representing a vehicle path control portion 11, a brake control portion 12, an engine control portion 13, and a steering control portion 13.

The turning control ECU 10 receives (a) wheel rotation signals from the wheel speed sensors 5FR, 5FL, 5RR, 5RL corresponding to the respective wheel speeds of the wheels 5FR to 5RL; (b) an image signal of the front and rear of the vehicle 1 from the surroundings monitoring sensors 7a and 7b; (c) a steering angle signal from the steering sensor 8; (d) a yaw rate signal from the yaw rate sensor 9; and (e) respective operation signals from a parking assist switch 20 and a U-turn assist switch 21 that are operated by the driver. Then, in accordance with the received signals, the turning control ECU 10 outputs control signals for respective actuators to a brake control portion 12 and an engine control portion 13 in order to perform a desired turning operation. These control signals are obtained using a processing routine of a control flow described hereinafter.

The turning control ECU 10 both (i) detects obstacles to the front and rear of the vehicle 1 using a known method based on the image signal from the surroundings monitoring sensors 7a and 7b, and (ii) calculates 2-dimensional coordinates for the obstacles with a vehicle center point O of a sensor field of view as an origin.

Figure 3:
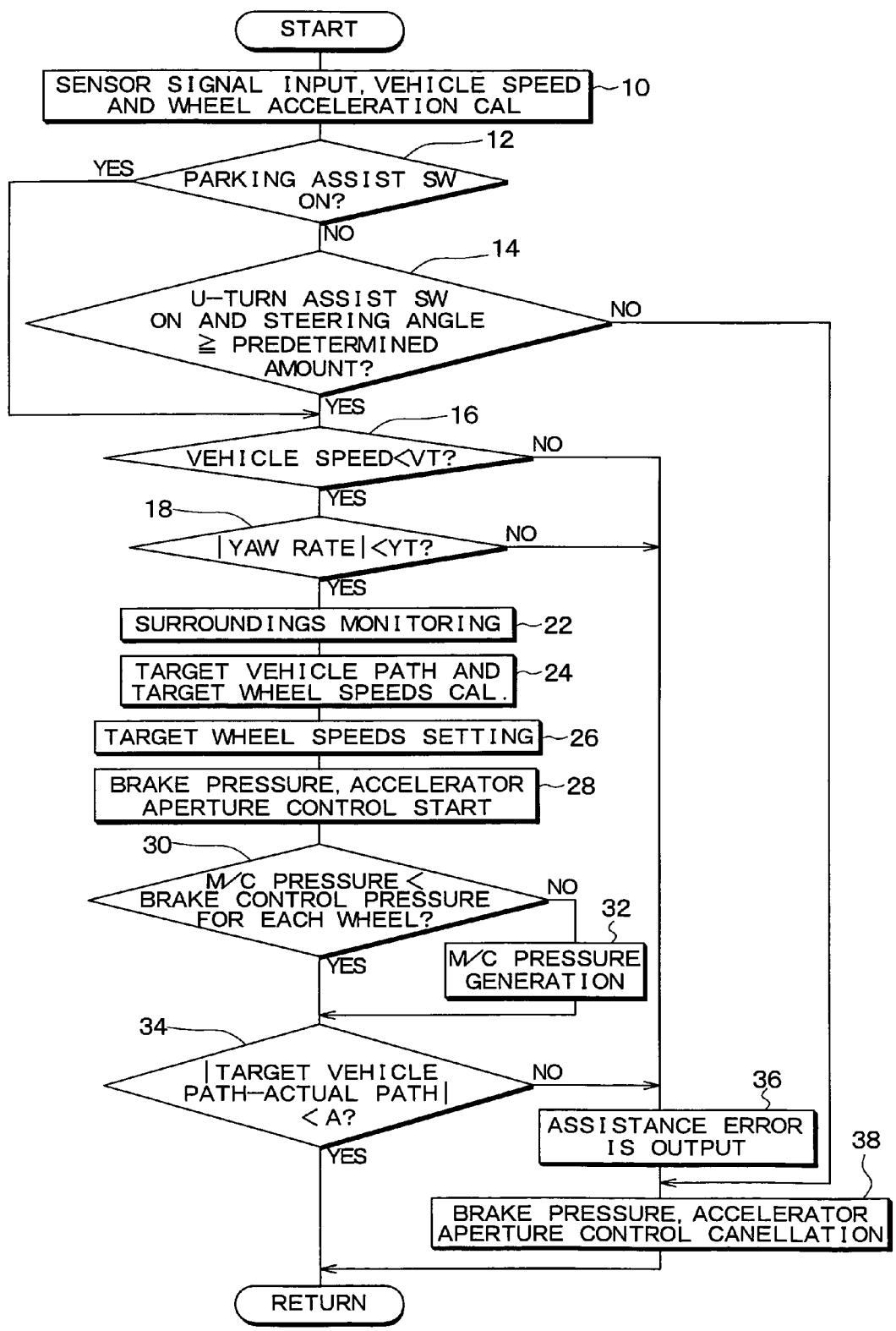
FIG. 3 is a flow chart of a turning control routine.

Next, the computer program processing carried out by the turning control ECU 10 during turning control will be explained with reference to FIG. 3, which is a flow chart showing a turning control routine. This turning control routine is repeatedly performed with a predetermined cycle.

First, at 10, each sensor signal is read, and a vehicle speed (vehicle body speed) and a wheel acceleration that are necessary signals for turning control are calculated based on the wheel speed signals of the wheels 5FR to 5RL. The vehicle speed is calculated as, for example, an average value of the wheel speeds of the driven wheels (in this embodiment for a front wheel drive vehicle, the left and right rear wheels 5RR and 5RL). Further, the wheel acceleration is calculated based on a change value per unit time of the respective vehicle wheel speeds.

The processing at 10 is performed by a vehicle speed calculation portion of the turning control ECU 10. Note that, detection processing for the vehicle speed may be performed using calculation based on the wheel speeds. However, the detection processing may also be performed by, for example, providing a sensor (not shown) for directly detecting the vehicle speed (the vehicle body speed), and reading the detection signal from this sensor.

Next, it is determined at 12 whether the parking assist switch 20 has been turned on by the driver. In the case that the parking assist switch 20 has been turned on, it is taken that parking assist is being performed, and the processing routine jumps to the processing at 16 for turning control. On the other hand, if the switch 20 is not turned on, the routine proceeds to the processing at 14.

Parking assist is performed in a known manner. When the parking assist switch 20 is turned on, the turning control ECU 10 is provided with a desired parking position or a U-turn path, which are determined in advance by the driver by referring to images displayed on a display panel, not shown, from the surroundings monitoring sensors 7a and 7b. The turning control ECU 10 then calculates and sets a target vehicle path based on the provided parking position or U-turn path.

At 14, it is determined whether the U-turn assist switch 21 has been turned on by the driver, and whether the steering angle from the steering sensor 8 is equal to or above a predetermined value (this value is in the vicinity of left or right full lock). When the determination result is YES, it is taken that U-turn assist is being performed and the routine proceeds to the processing at 16 for turning control. On the other hand, when the determination result is NO, the routine proceeds to the processing at 38, and then returns to start without the turning control processing of the present invention being performed.

At 16, it is determined whether the vehicle speed (the vehicle body speed) is lower than a threshold value VT set in advance. In the case that it is lower, namely, it is determined that the vehicle 1 is running at low speed, the routine proceeds to the processing at 18. However, when the vehicle 1 is determined not to be running at low speed, the routine proceeds to the processing at 36. Note that, the threshold value VT for the vehicle speed is set at around a few km/h (for example, 2 to 3 km/h), which is the upper limit of the speed range suitable for turning control.

Next, at 18, it is determined whether the magnitude of the yaw rate of the vehicle body detected by the yaw rate sensor 9 is smaller than a pre-set threshold value YT. When the yaw rate is larger than the threshold value YT, turning control should be not performed vehicle because behavior is highly dynamic and problems related to running safety will be caused. Accordingly, the routine proceeds to the processing at 36. On the other hand, if the yaw rate is lower than the threshold value YT, the routine proceeds to the processing at 22.

The processing at 12, 14, 16 and 18 is performed by a low speed turning determination portion of the turning control ECU 10. If it is determined by this processing that the vehicle speed is low and the yaw rate is comparatively low, the routine proceeds to the processing at 22 in order to perform turning control. At 22, the image signal from the surroundings monitoring sensor 7a (or surroundings monitoring sensor 7b) is used to identify if there are any obstacles that will obstruct vehicle movement in the front imaged zone in front of the vehicle 1 (or alternatively, in the rear imaged zone). 2-dimensional coordinates with the vehicle center point O as an origin are then calculated for any identified obstacles.

Next, at 24, the target vehicle path and target wheel speeds VFR, VFL, VRR and VRL for the respective wheels 5FR to 5RL are calculated. Within the turning control ECU 10, the portion that performs this processing corresponds to a target path setting portion. The calculation processing of this portion will be described hereinafter. Next, at 26, the target wheel speeds VFL, VFR, VRL and VRR for each wheel 5FR to 5RL are set. The portion within the turning control ECU 10 that performs this processing corresponds to a target wheel speed setting portion.

Following this processing, at 28, in order to change the actual wheel speeds of the wheels 5FR to 5RL so that they become the target wheel speeds VFR, VFL, VRR and VRL, a brake pressure of each wheel 5FR to 5RL is increased or decreased (brake control pressure setting), and an accelerator aperture is adjusted to control an output torque of the engine 3. The specific details of this control will be explained later. Note that, the portion of the turning control ECU 10 that performs the processing at 28, the brake control portion 12, and the brake actuator 2 correspond to a braking force control portion. Moreover, the portion of the turning control ECU 10 that performs the processing at 28, the engine control portion 13, and the engine 3 correspond to a driving force control portion.

At 30, it is determined whether a master cylinder (M/C) pressure generated by operation of the brake pedal by the driver is smaller than the brake control pressure for each wheel 5FR to 5RL set during the processing at 28. When the M/C pressure is smaller than the brake control pressure, the set brake control pressure is generated. On the other hand, if the M/C pressure is higher than the brake control pressure, at 32, the normal brake pressure generated by the M/C pressure resulting from the brake pedal operation is applied to each wheel 5FR to 5RL.

At 34, it is determined whether a deviation between the set target vehicle path and a projected actual path that the vehicle will move along is larger than a pre-set threshold value A. If the deviation exceeds the threshold value A, turning control is cancelled and the routine proceeds to the processing at 36. However, while the deviation does not exceed the threshold value A, the control routine repeats. The portion of the turning control ECU 10 that performs the processing at 34 corresponds to a path deviation calculation portion.

Note that, if the driver has instructed that parking assist or U-turn assist should be performed, but it has been determined that the turning control should be cancelled at 36 in the above manner, a notification like "Assistance Error" is displayed, for example, on the display panel for displaying the images from the surroundings monitoring sensors 7a and 7b.

Next, in the following processing at 38, control of the brake pressure and the accelerator aperture under the turning control is cancelled, and the brake pressure and the accelerator aperture return to being controlled in accordance with the brake pedal operation and the accelerator pedal operation of the driver in normal running.

Figure 4:
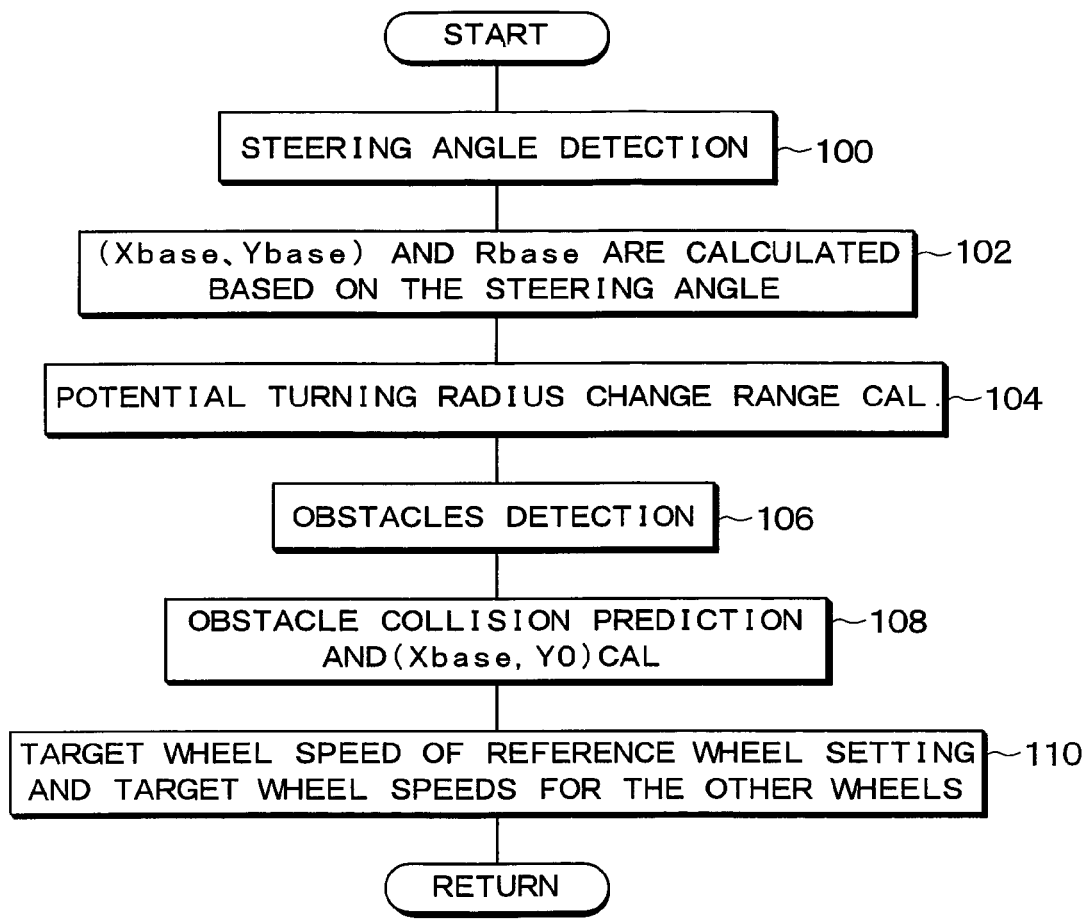
FIG. 4 is a flow chart illustrating a calculation procedure for a target vehicle path.

Next, the calculation processing for the target vehicle path and the target wheel speeds of the wheels 5FR to 5RL performed at 24 will be explained with reference to FIGS. 4 and 5. FIG. 4 is a flow chart showing a detailed explanation of the processing at 24, and FIG. 5 shows the relationships of a steering angle $\delta$, a turning radius, and a target center of rotation.

First, at 100, the steering angle $\delta$ of the front wheels 5FL and 5FR is detected using the steering sensor 8. Then, at 102, a known method is used to calculate a geometric axis of rotation (X base, Y base) determined geometrically, and a geometric turning radius R base thereof.

Figure 5:
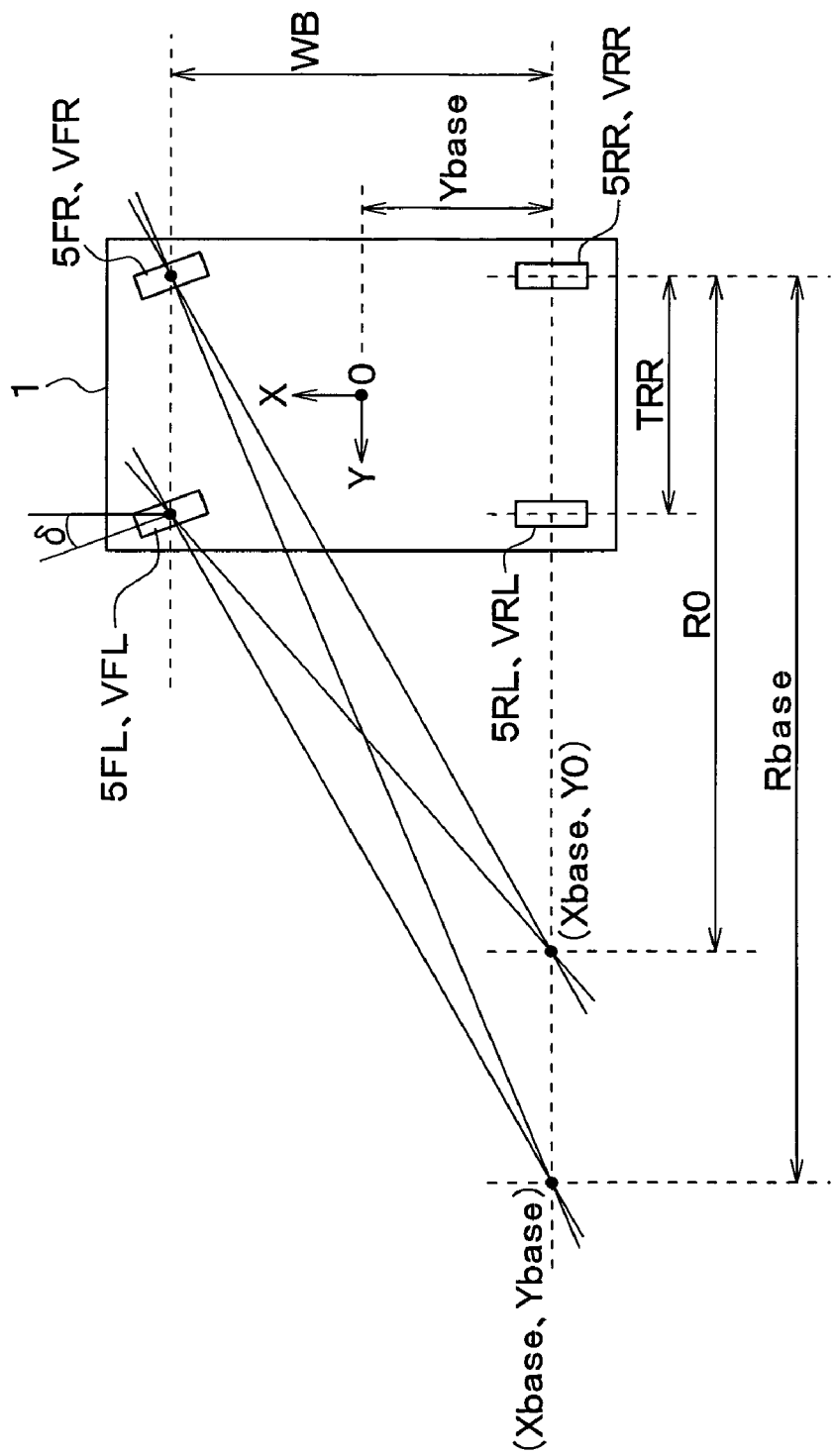
FIG. 5 shows the relationships between a steering angle, a turning radius, and a target center of rotation.

FIG. 5 illustrates an example in which the vehicle 1 is turning to the left. The rear wheel at the outside of the turn, namely, the right rear wheel 5RR, which is a driven wheel, is taken as a reference wheel. It is possible to make the turning radius in the left direction smaller by generating a substantial speed difference between the inside and outside wheels by, for example, applying a large braking force to the rear left wheel 5RL and applying no braking force to the right rear wheel 5RR. At this time, the geometric axis of rotation (X base, Y base) lies on the line of the rear wheel axle direction. Accordingly, X base is equal to the distance between the vehicle center point O and the rear wheel axle. Moreover, when the rear wheel tread is taken as TRR, the geometric turning radius R base is equal to Y base+TRR/2.

At 104, a potential turning radius change range is calculated based on the detected steering angle $\delta$. This potential turning radius change range indicates the range of change in the turning radius that can potentially be generated when the inside and outside wheels are driven at different speeds for each steering angle of the front wheels, which are the steered wheels. In other words, if the wheel at the outside of the turn is caused to have a higher speed than that at the inside, the turning radius is made smaller in accordance with the speed difference. However, for each vehicle, there is a minimum turning radius at which turning can stably take place. The potential turning radius change range is thus mapped in advance as a design value for each vehicle. At 104, the potential turning radius change range is calculated for the steering angle using the map.

At 106, the coordinates (Xi, Yi) for any obstacles detected by the processing at 22 are calculated. Then, in the following processing at 108, a known method (for example, the method disclosed in Japanese Patent Laid-Open Publication No. 2002-96750) is used to predict whether any detected obstacle (Xi, Yi) lie on the projected actual path of the vehicle 1. In the case that an obstacle is on the projected actual path, the coordinates of the position of the target center of rotation (X base, YO) of turning is calculated for the target vehicle path in order to avoid the obstacle. Note that, YO=RO−TRR/2.

Next, at 110, the target wheel speed (VtRR) of the reference wheel (in the example of FIG. 5, the rear wheel 5RR at the outside of the turn), is set to, for example, 2 km/h, and the target wheel speeds VtFL, VtFR, VtRL for the other wheels FL, FR, RL are calculated. More specifically, the calculation is performed in the following manner.

If the yaw rate during turning is taken as $\omega$ based on FIG. 5, Equation 1 below is established.

$$\omega = VtRR/R0 = (VtRR - VtRL)/TRR \quad \text{Equation (1)}$$

Based on Equation 1, Equation 2 can be established.

$$VtRL = (R0 - TRR) \cdot \omega = (R0 - TRR) \cdot VtRR/R0 \quad \text{Equation (2)}$$

Further, if the distance between the front and rear axles is taken as wheel base WB, then Equations 3 and 4 can be obtained.

$$VtFR = \omega \cdot (RO2 + WB2)^{1/2} \quad \text{Equation (3)}$$

$$VtFL = \omega \cdot ((RO - TRR)2 + WB2))^{1/2} \quad \text{Equation (4)}$$

Accordingly, first, the target wheel speed VtRR of the reference wheel is set, and then the target yaw rate ωis obtained based on the set value VtRR using Equation 1. Then, the target wheel speeds VtRL, VtFR, VtFL are calculated for the wheels 5RL, 5FR, 5FL using Equation 2 obtained by rearranging Equation 1, and Equations 3 and 4. The target wheel speeds VtRR, VtRL, VtFR and VtFL of the wheels 5FR to 5RL calculated in this manner are set to have an inside-outside wheel speed difference for both the front and rear wheels 5FR to 5RL, such that (a) the target wheel speed difference of the front wheel 5FR at the outside of the turn and the front wheel 5FL at the inside of the turn (the inside-outside wheel speed difference) becomes VtFR−VtFL>0, based upon Equations 3 and 4, and (b) the target wheel speed difference of the rear wheel 5RR at the outside of the turn and the rear wheel 5RL at inside of the turn (the inside-outside wheel speed difference) becomes VtRR−VtRL>0. Accordingly, the position of the axis of rotation moves closer to the vehicle 1, and the turning radius becomes smaller, namely, RO. Thus, it is possible for the vehicle 1 to turn without colliding with the obstacle.

Figure 6:
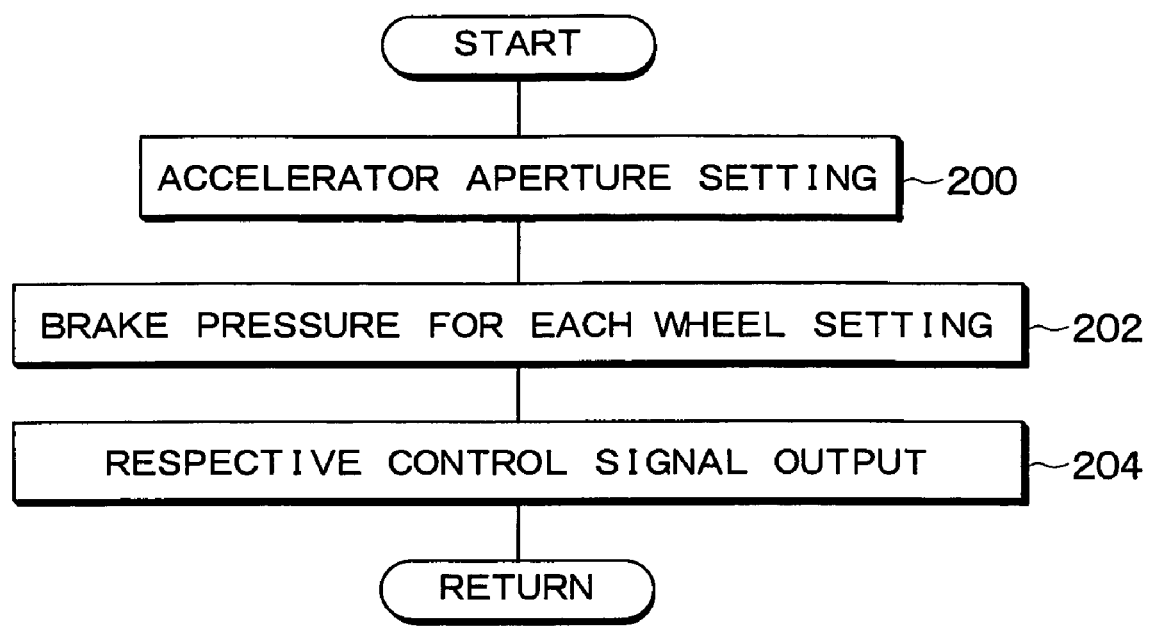
FIG. 6 is a flow chart illustrating a control routine for a brake pressure and an accelerator aperture.

Once the target wheel speeds have been calculated and set in the above manner for the wheels 5FR to 5RL (at 26), control of the brake pressure and accelerator aperture for achieving these target wheel speeds is performed at 28 as described below. The flow chart shown in FIG. 6 will be used to explain this control.

First, at 200, the accelerator aperture is set for driving force control. More specifically, based on the map shown in FIG. 7, the accelerator aperture is determined in accordance with (a) the relative magnitude of the actual wheel speed (VRR) of the reference wheel (5RR) with respect to the target wheel speed (VtRR) of the reference wheel, and (b) the magnitude of an actual wheel acceleration of the reference wheel. This processing aims to increase the wheel speed of the reference wheel to the maximum value possible while making sure that the vehicle 1 is not caused to stop by performance of braking control during the turning control.

More specifically, four fast-to-slow speed ranges for the target wheel speed are set with respect to the actual wheel speed of the reference wheel, and three magnitudes ranges are set with respect to the actual wheel acceleration of the-reference wheel. In FIG. 7, VA, VB, and VC, represent setting values for the actual wheel speed, with the relationship between them being 0<VB<VA, VC>0. Further, G1 and G2 are setting values for the actual wheel acceleration, with the relationship between them being 0<G1<G2.

In FIG. 7, "Rapid Closing" indicates changing the accelerator aperture by reducing it comparatively rapidly so as to reduce engine torque. On the other hand, "Rapid Opening" indicates changing the accelerator aperture by increasing it comparatively rapidly so as to increase engine torque. Moreover, "Slow Closing" and "Slow Opening" indicate that the engine torque is respectively reduced or increased in a comparatively slow manner. "Aperture Maintained" refers to when the engine toque is not changed.

Accordingly, for example, when the actual wheel speed is comparatively slow (in range 4. of FIG. 7), in accordance with the magnitude of the actual wheel acceleration at that time, (i) if the actual wheel acceleration is at a low level (smaller than G1), the accelerator aperture is set to increase rapidly so that the actual wheel speed rapidly approaches the target wheel speed; and (ii) if the actual wheel acceleration is at a middle or high level, the accelerator aperture is set to gently increase so that the target wheel speed is approached without causing a sudden increase in the actual wheel speed. Alternatively, if the actual wheel speed is within the maximum range (in range 1. of FIG. 7), (a) if the actual wheel acceleration is small, the accelerator aperture is not changed, namely, it is maintained at the same aperture; and, (b) if the actual wheel acceleration is in the high range (larger than G2), the accelerator aperture is set to rapidly reduced (Rapid Closing).

In this manner, control of the accelerator aperture enables control of the brake pressure for turning control, without causing the vehicle 1 to be stopped, in particular, when increasing the brake pressure. Moreover, appropriate adjustment of the accelerator aperture, namely, from Rapid Opening to Aperture Maintained and Rapid Closing, is performed in accordance with the actual wheel speed of the reference wheel and the magnitude of the wheel acceleration. Accordingly, it is possible to rapidly achieve a stable turning state in an accurate manner.

Next, at 202, the brake pressure for each wheel 5FR to 5RL is set for braking force control. More specifically, the brake pressure is set for each wheel 5FL, 5FR, 5RR and 5RL based on the map shown in FIG. 8 in accordance with (a) the relative magnitude of the actual wheel speeds with respect to the target wheel speeds, and (b) the magnitude of the actual wheel acceleration. This processing aims to make the actual wheel speed of each wheel 5FR to 5RL equal to the target wheel speed by the time the turning control is completed.

In this control of the brake pressure, as in the above described control of the accelerator aperture, four fast-to-slow speed ranges for the target wheel speed are set with respect to the actual wheel speed, and three magnitudes ranges are set with respect to the actual wheel acceleration. In FIG. 8, "Rapid Pressure Increase" indicates increasing the W/C pressure of the corresponding wheel 5FL, 5FR, 5RR or 5RL comparatively rapidly so as to increase the braking force. On the other hand, "Rapid Pressure Decrease" indicates decreasing the W/C pressure comparatively rapidly so as to reduce the braking force. Moreover, "Slow Pressure Increase" and "Slow Pressure Decrease" indicate that the braking force is respectively increased or decreased in a comparatively slow manner. "Hydraulic Pressure Maintained" refers to when the braking force is not changed.

In this manner, control of the brake pressure of each wheel 5FR to 5RL enables the actual wheel speed thereof to become equal to the set target wheel speed. At this time, appropriate adjustment of the brake pressure, namely, from Rapid Pressure Decrease to Hydraulic Pressure Maintained and Rapid Pressure Increase, is performed in accordance with the actual wheel speed and the magnitude of the wheel acceleration. Accordingly, it is possible to rapidly achieve a stable turning state in an accurate manner.

At 204, control signals for the set accelerator aperture and the brake pressure are respectively sent to the brake control portion 12 and the engine control portion 13, whereby the brake actuator 2 and the engine 3 are controlled.

In the above manner, in the turning control of this embodiment, a speed difference is generated between the inside and outside wheels of the turn. Accordingly, it is possible to turn with a turning radius that is smaller than that achieved by the steering angle of the normal steering operation.

Further, with this embodiment, in the turning control, the target wheel speeds are set for each wheel 5FR to 5RL such that the desired target vehicle path is achieved. Then, the braking forces and the driving forces of the respective wheels 5FR to 5RL are controlled so that the respective target wheel speeds are generated while the vehicle speed (the vehicle body speed) is maintained, whereby the vehicle 1 is caused to move along the target path.

At this time, if a deviation larger than a predetermined value becomes present between the projected actual path of the vehicle 1 and the target path, it is possible to ensure stable running by canceling the turning control.

Moreover, the turning control is also cancelled if vehicle behavior becomes unstable, and thus it is possible to ensure running stability and safety.

Note that, during parking assist or the like, the steering angle command value is applied to the EPS unit 4 so that the vehicle 1 moves along the target vehicle path. However, there may be occasions when a steering angle according with the command value cannot be achieved due to inadequate capability of the actuator of the EPS unit 4, or excessive reaction force of the steered wheels on a rough road. Even in this case, however, in the steering control of the embodiment, control is performed such that the wheel speed of each wheel 5FR to 5RL is made equal to the target wheel speed. Accordingly, it is possible for the vehicle 1 to perform a turn in line with the target vehicle path.

OTHER EMBODIMENTS

The above described embodiment may be configured such that a road surface friction coefficient (road surface $\mu$) is detected. If the target vehicle path or the target wheel speed is corrected in accordance with this road surface $\mu$, even on road surfaces that have low road surface $\mu$, namely, that are slippy, it is possible to turn with a small turning radius while maintaining vehicle stability. As is well known, the road surface $\mu$ may be calculated during running based on the actual wheel speed of each wheel 5FR to 5RL, and the yaw rate.

An example is described in the above embodiment in which the driving force control portion functions such that the accelerator aperture is controlled to adjust the torque generated by the engine 3. However, the invention is not limited to this, and may be applied to a vehicle having an electric motor that drives the driving wheels (for example, a hybrid vehicle or a fuel cell vehicle), as long as the output of a drive source can be adjusted.

Further, as long as the brake actuator 2 is capable of independently applying braking force to the four wheels as described above, the brake actuator 2 may be an automatic brake device in which a master cylinder pressure is generated in accordance with a brake pedal operation value and then distributed to a wheel cylinder of each wheel via a hydraulic line. Alternatively, the brake actuator 2 may be an electric brake device that generates braking force in accordance with a brake pedal operation value by driving an actuator like an electric motor provided on each wheel.

While the above description is of the preferred embodiments of the present invention, it should be appreciated that the invention may be modified, altered, or varied without deviating from the scope and fair meaning of the following claims.

What is claimed is:

1. A turning control device comprising:
   a wheel speed detection portion that detects a wheel speed of a wheel of a vehicle;
   a vehicle speed detection portion that detects a speed of the vehicle;
   a turning operation detection portion that detects whether the vehicle is in a turning operation state;
   a low speed turn determination portion that determines whether turning control needs to be performed when the vehicle is in the turning operation state while running at a low speed less than a predetermined value;
   a target wheel speed setting portion that sets a target wheel speed of the wheel such that the vehicle is caused to move along a desired turning path, wherein
      the desired turning path is a target turning path that is calculated based on a desired parking position,
      the vehicle is controlled to travel along the desired turning path by a turning control,
      the turning control controls a braking force of the wheel so that the vehicle moves along the desired turning path,
      the target wheel speed setting portion includes a turning radius calculation portion that calculates a turning radius such that the vehicle is caused to move along the desired turning path,
      the target wheel speed setting portion includes a target wheel speed calculation portion that calculates the target wheel speed based on the calculated turning radius,
      the target radius calculated by the turning radius calculation portion is smaller than a geometric turning radius that is geometrically determined based on a steering angle without the braking force; and
   a braking force control portion that controls braking force applied to the wheel such that, when it is determined that the turning control needs to be performed, the wheel speed is caused to converge on the set target wheel speed.

2. The turning control device according to claim 1, further comprising:
   a driving force control portion for controlling driving force of the vehicle such that the wheel speed converges on the target wheel speed.

3. The turning control device according to claim 2, wherein when a wheel at the outside of a turn of the vehicle is taken as a reference wheel, the driving force control portion controls the driving force of the vehicle in accordance with a wheel speed of the reference wheel, and a target wheel speed of the reference wheel.

4. The turning control device according to claim 1, wherein the target wheel speed setting portion cause there to be a speed difference between respective left and right target wheel speeds of, at least one of, a left and right pair of front wheels, and a left and right pair of rear wheels.

5. The turning control device according to claim 1, further comprising:
   a target path setting portion that sets a target vehicle path of the vehicle, wherein
   the target wheel speed setting portion sets the target wheel speed in accordance with the set target vehicle path.

6. The turning control device according to claim 5, further comprising:
   a surrounding environment detection unit that detects a surrounding environment of the vehicle, wherein
   the target path setting portion sets the target vehicle path in accordance wit the detected surrounding environment.

7. The turning control device according to claim 5, further comprising:
   a path deviation calculation portion that calculates a deviation between a projected actual path of the vehicle and the target vehicle path, and, when the deviation exceeds a pre-set determined value, terminates operation of the braking force control portion.

8. A turning control method, comprising the steps of:
   detecting a wheel speed of a wheel of a vehicle;
   detecting a speed of the vehicle;
   determining whether the vehicle is in a turning operation state;
   determining whether turning control needs to be performed when the vehicle is in the turning operation state while running at low speed;
   setting a target wheel speed of the wheel such that the vehicle is caused to move along a desired turning path; and
   controlling braking force applied to the wheel such that, when it is determined that the turning control needs to be performed, the braking force is controlled in accordance with the wheel speed and the set target wheel speed, wherein
   the turning control is for controlling braking force of the wheel so that the vehicle moves on a desired turning path, and
   the setting of the target wheel speed includes calculating a target wheel speed based on the desired turning path and a position of the vehicle.

9. A turning control device comprising:
   a wheel speed detection portion that detects a wheel speed of a wheel of a vehicle;
   a vehicle speed detection portion that detects a speed of the vehicle;
   a turning operation detection portion that detects whether the vehicle is in a turning operation state;
   a low speed turn determination portion that determines whether turning control needs to be performed when the vehicle is in the turning operation state while running at a low speed less than a predetermined value;
   a target wheel speed setting portion that sets a target wheel speed of the wheel such that the vehicle is caused to move along a desired turning path, wherein
   the desired taming path is a target turning path that is calculated based on a desired parking position,
   the vehicle is controlled to travel along the desired turning path by a turning control,
   the turning control controls a braking force of the wheel so that the vehicle moves along the desired tuning path,
   the target wheel speed setting portion includes a turning radius calculation portion for calculating a turning radius such that the vehicle is caused to move along the desired turning path,
   the target wheel speed setting portion includes a target wheel speed calculation portion for calculating the target wheel speed based on the calculated turning radius, and
   the target radius calculated by the turning radius calculation portion is smaller than a geometric turning radius that is geometrically determined based on a steering angle without the braking force; and
   a braking force control portion that controls braking force applied to the wheel such that, when it is determined that the turning control needs to be performed, the wheel speed is caused to converge on the set target wheel speed wherein
   the target wheel speed setting portion causes there to be a speed difference between respective left and right target wheel speeds of at least one pair of a) left and right front wheels and b) left and right rear wheels, and
   the target wheel speed setting portion sets a speed difference between respective left and right target wheel speeds of the at least one pair, based on the desired turning path.

10. A turning control device comprising:
    a wheel speed detection portion that detects a wheel speed of a wheel of a vehicle;
    a vehicle speed detection portion that detects a speed of the vehicle;
    a turning operation detection portion that detects whether the vehicle is in a turning operation state;
    a low speed turn determination portion that determines whether turning control needs to be performed when the vehicle is in the turning operation state while running at a low speed less than a predetermined value;
    a target wheel speed setting portion that sets a target wheel speed of the wheel such that the vehicle is caused to move along a desired turning path, wherein the desired turning path is a target turning path that is calculated based on a desired parking position, and the vehicle is controlled to travel along the desired turning path by a turning control; and
    a braking force control portion that controls braking force applied to the wheel such that, when it is determined that the turning control needs to be performed, the wheel speed is caused to converge on the set target wheel speed, wherein
    the turning control controls braking force of the wheel so that the vehicle moves along a desired turning path, and
    the target wheel speed setting portion includes
      a rotation axis calculation portion that calculates an axis of rotation based on a desired turning path and a position of the vehicle,
      a target turning radius calculation portion that calculates a turning radius based on the calculated the axis of rotation, and
      a wheel speed calculation portion that calculates the target wheel speed based on the calculated turning radius.

11. The turning control device according to claim 10, wherein
    the target wheel speed setting portion further includes a target yaw rate calculation portion for calculating a target yaw rate, a center of which is the calculated axis of rotation, and
    the wheel speed calculation portion calculates the target wheel speed based on the calculated target yaw rate.

* * * * *